United States Patent [19]

Rowley

[11] Patent Number: 4,664,423
[45] Date of Patent: May 12, 1987

[54] POLYBUTYLENE TUBE COUPLING AND METHOD FOR MAKING IT

[76] Inventor: William W. Rowley, 11524 Wilbert Rd., Chardon, Ohio

[21] Appl. No.: 621,170

[22] Filed: Jun. 15, 1984

[51] Int. Cl.$^4$ .................. B29C 43/00; B29C 65/00
[52] U.S. Cl. ..................... 285/256; 29/447; 29/469.5; 29/508; 29/516; 264/230; 264/249; 264/322; 285/423
[58] Field of Search ............... 285/256, 382, 382.2, 285/423 X; 29/447, 469.5, 505, 508, 516, 230, 249; 264/230, 249, 322, 249, 236, 322, 274, 342 R

[56] References Cited

U.S. PATENT DOCUMENTS

| | | | |
|---|---|---|---|
| 2,001,204 | 5/1935 | Long et al. | 285/382 |
| 2,865,094 | 12/1958 | Press | 29/508 |
| 3,017,203 | 1/1962 | Macleod | 285/256 |
| 3,243,208 | 3/1966 | Lalikos et al. | 285/259 |
| 3,315,986 | 4/1967 | Quick | 285/381 |
| 3,532,366 | 10/1970 | Rakus et al. | 264/230 |
| 3,596,939 | 8/1971 | Gibson | 29/516 |
| 3,610,665 | 10/1971 | Mingo | 285/256 |
| 3,833,019 | 9/1974 | Diggs | 285/259 |
| 3,860,268 | 1/1975 | Zeman | 285/423 |
| 3,889,351 | 6/1975 | Tischunger | 264/249 |
| 3,929,958 | 12/1975 | Parmann | 264/249 |
| 4,206,909 | 6/1980 | Wintle | 29/230 |
| 4,207,364 | 6/1980 | Nyberg | 264/230 |
| 4,321,743 | 3/1982 | Ridenaur | 29/516 |
| 4,366,841 | 1/1983 | Currie et al. | 285/256 |
| 4,392,294 | 7/1983 | Campbell | 29/516 |
| 4,392,678 | 7/1983 | Adamczyk | 285/256 |

Primary Examiner—Willard E. Hoag
Attorney, Agent, or Firm—Renner, Otto, Boisselle & Lyon

[57] ABSTRACT

A polybutylene tubing coupling and method of making that coupling utilizes a male tubular connector element having the same inside diameter as the major extent of the tubing. A coupling element is provided with stop shoulder at one end and a series of annular radially projecting barbs on its outside diameter which are preferably undercut in the direction of the stop shoulder or tubing end. An end of the tube is treated preferably by heating to enable the material to expand and the tubing end is inserted on or slipped over the male element against the stop shoulder. In such position the treated tubing end is mechanically compressed between two semi-circular dies to cause the material of the treated tubing end to flow around the barbs. Thereafter a metal crimp is placed around the tubing end between the stop shoulder and the next adjacent barb, or over the top of one or all barbs. The tubing connection thus formed is then permitted to cool at ambient temperature for approximately 7 days. During such period approximately 1.8% shrinkage will occur in the polybutylene material forming a tight secure tubing connection.

4 Claims, 4 Drawing Figures

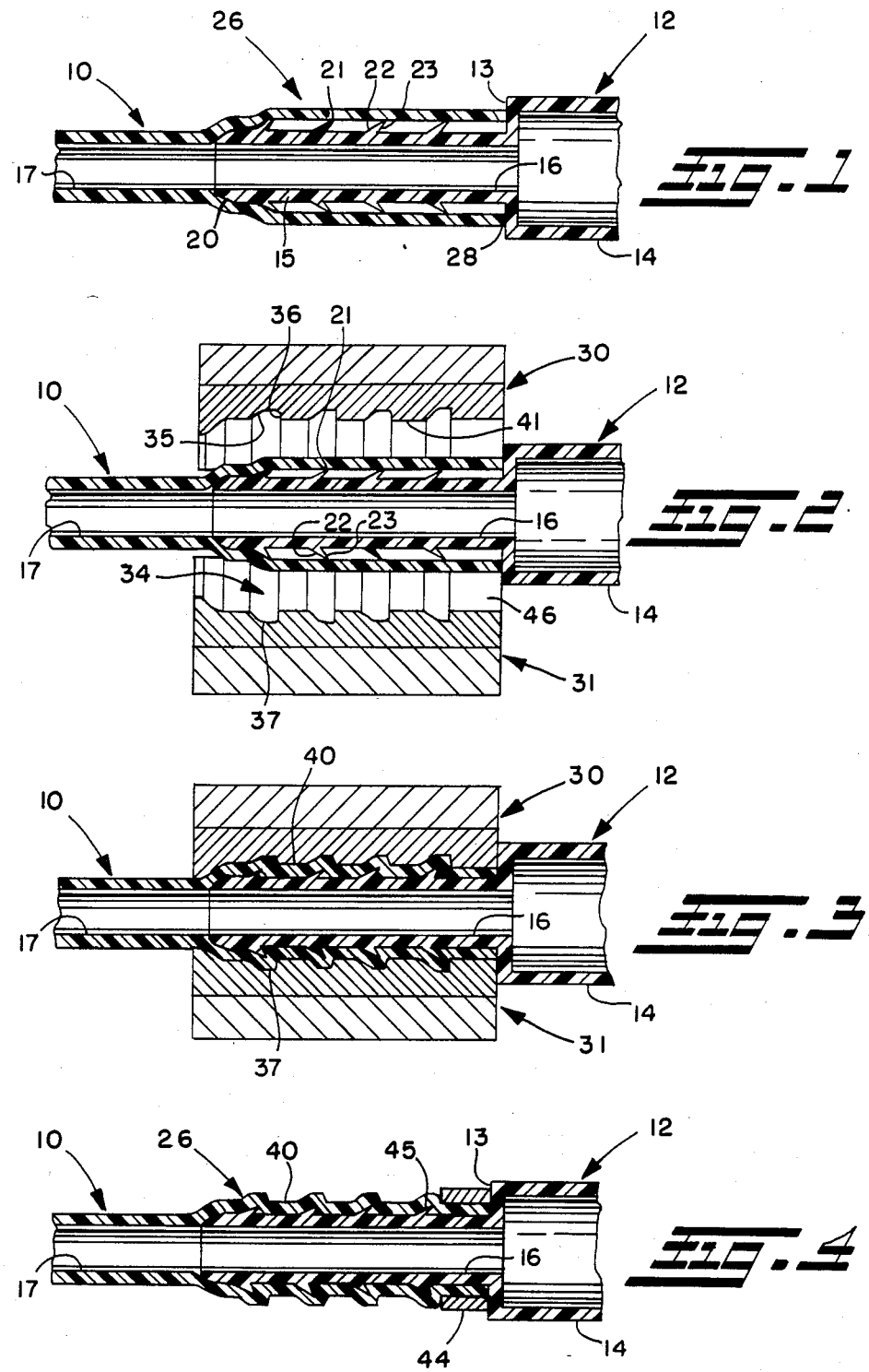

POLYBUTYLENE TUBE COUPLING AND METHOD FOR MAKING IT

This invention relates generally as indicated to a polybutylene tubing connection and more particularly to a method for quickly and economically forming tubing joints useful in a variety of applications and particularly in hot and cold water plumbing.

BACKGROUND OF THE INVENTION

Polybutylene pipe and tubing is now fabricated by extrusion technology and such tubing is finding wide application in hot and cold water plumbing. Various types of fittings are employed with such polybutylene tubing, one example being that shown in applicant's prior U.S. Pat. No. 4,316,870 wherein the tubing end is reshaped to provide a conical or spherical end and flange, the tubing end then being connected to a conventional fitting for plastic or copper plumbing. However, for other types of fittings, different forms of connections are required.

Another example of a fitting and process for making that fitting is shown in Canadian Pat. No. 684,896 issued Apr. 21, 1964 to Montecatini. The process disclosed in such Canadian patent involves the steps of cross-linking at least one end of the pipe by impregnating the pipe end with an organic peroxide and also applying heat thereto. After the tubing end is inserted on a coupling member, the entire coupling is then further heated to a higher temperature than the melting point of the uncrosslinked plastic polymeric material. Such a process is time consuming and hard to control and is usually not suitable if the coupling member itself is of a plastic material.

SUMMARY OF THE INVENTION

The present invention utilizes a method of making a polybutylene tubing connection which comprises the steps of treating an end of such tubing to make it somewhat flowable. A male coupling element of metal or plastic is then telescoped into the treated end to expand it over the element. The element includes radially extending barbs which are preferably undercut in the direction of the tubing end. The male coupling element also includes a stop shoulder. After the elements are telescoped and while the material of the tubing end is still flowable, the expanded end is mechanically compressed by a set of half-round dies which are shaped to cause the material of the tubing end to flow around such barbs and tightly embrace the outside diameter of the male coupling element. Thereafter a metal crimp is placed around the tubing end preferably between the stop shoulder and the next adjoining barb, or between any two barbs or it may actually extend over some one or more barbs. The connection thus formed is then permitted to cool at ambient temperature and over an extended period such as 7 days the material will shrink approximately 1.8%. In this manner a secure tight tubing connection is formed. Preferably, the inside diameter of the tubing is the same as the inside diameter of the male coupling element.

There is with the noted process then provided a polybutylene tubing connection which includes a male tubular element having an outside diameter and an inside diameter with a stop shoulder on one end of the outside diameter of that element. The outside diameter is provided with a series of annular radially projecting barbs each of which in the preferred form includes two or more intersecting conical surfaces both extending at an acute angle to the axis of the element and directed toward the stop shoulder. A polybutylene tube having the same inside diameter as the male element throughout its major length includes an expanded end which is slipped over the male element against the stop shoulder and then mechanically compressed to embrace the male element and cause the material of the tubing end to flow around the barbs. A metal crimp is then placed around the tubing end preferably between the stop shoulder and the next adjacent barb. The cooling of the expanded and compressed tubing end causes the material of the tubing end to shrink forming a tight tubing connection or joint.

To the accomplishment of the foregoing and related ends, the invention, then comprises the features hereinafter fully described and particularly pointed out in the claims, the following description and the annexed drawing setting forth in detail a certain illustrative embodiments of the invention, these being indicative, however, of but a few of the various ways in which the principals of the invention may be employed.

BRIEF DESCRIPTION OF THE DRAWINGS

FIG. 1 is a fragmentary axial section illustrating the tubing end and the male connecting element telescoped together;

FIG. 2 is a view similar to FIG. 1, but shown with the partially formed connection aligned with the compression dies;

FIG. 3 is a view similar to FIG. 2, but illustrating the compression dies closed; and FIG. 4 is a similar view of the finished fitting with the metal crimp positioned around the tubing end between the stop shoulder and the next adjacent barb.

DETAILED DESCRIPTION OF THE DRAWINGS

Referring first to FIG. 1 there is illustrated a polybutylene tubing 10 telescoped over male connecting element 12 which includes a stop shoulder 13 between the enlarged end 14 and the tubular somewhat longer portion 15. The tubular portion 15 has an inside diameter 16 which is the same as the inside diameter 17 of the tubing section 10.

The end of the tubular section 5 is provided with a tapered feathered end 20 and the outside diameter of the tubular section 15 includes a series of annular radially projecting barbs 21, each of which preferably includes two intersecting conical surfaces seen at 22 and 23, both extending at an acute angle to the axis of the element and directed toward the stop shoulder 13. In the illustrated embodiment there may be provided four such annular barbs each equally axially spaced.

The male connecting element 12 is preferably a plastic material but it will be appreciated it may equally well be made of metal. Enlarged end 14 may be threaded to accomodate other fitting parts in a conventional manner.

To form the coupling or connection, an end portion of the tubing section 10 is treated, preferably by heating and over an axial length essentially the same as the axial length of the projecting tubular portion 15 of the male connector element 12. The treated end portion of the tube is shown at 26. After the end section of the tubing is treated, the two parts are telescoped together until the end of the tubing section abuts against the stop shoulder shown at 28. To facilitate the telescoping action and the concurrent enlargement of the tubing lend, the outside diameter of the tubular section 15 may be lubricated. This will also enhance the sealing effectiveness of the connection.

Referring now to FIG. 2, it will be seen that the telescoped parts are then placed in careful transverse alignment with half-round compression dies 30 and 31. All of this is done while the end portion 26 of the tubing section is still in a somewhat flowable condition. Alignment of the assembled parts with the compression dies may be obtained by suitable adjustable gauge stops, not shown. When the assembled parts are in the proper position the compression dies are then closed as seen in FIG. 3. This causes the flowable material of the end portion 26 to be compressed and to flow completely around the barbs 21. To ensure the proper flow of material the interior half-round tooling face of the dies 30 and 31 are provided with annular grooves 34, each of which includes an angled front edge 35 and a radial back edge 36 interconnected by a cylindrical portion 37. The grooves, of course, correspond to the barbs and when the dies are closed the material of the treated end portion of the tubing section is caused intimately to flow around the projecting barbs and embrace the outside diameter of the tubular portion 15.

After the assembled parts are removed from the dies it will be seen that the tubing end portion 26 is provided with a series of grooves 40 corresponding generally to the sections 41 of the dies between the grooves 34. After the assembled and compressed parts are removed from the pressing operation of FIG. 3, a metal crimp indicated at 44 is placed around the tubing end and the projecting tubular portion of the connector as indicated at 44. The metal crimp ring may be crimped in place for example, by a suitable crimping tool or press. As is indicated, the crimp is preferably placed between the stop shoulder 13 and the next adjacent barb indicated at 45, or within the groove formed by the portion 46 of the dies, as seen in FIG. 2. The crimp ring may, of course, be placed between any two annular barbs or it may extend over one or more barbs in effect flattening the ridges and grooves formed by the compressing operation. The crimp ring is, of course, simply a safety factor and may, under certain circumstances, be omitted.

Thereafter the connection seen in FIG. 4 is cooled. This will cause limited shrinking of the heated portion of the polybutylene tubing and preferably the cooling takes place at ambient temperature over an extended period. For example, at ambient temperature over a period of approximately 5-7 days the expanded and compressed tubing end portion 26 will age, cure and shrink approximately 1.8%. This simply ensures that the connection made as described above is tight and secure with the expanded end of the tubing section firmly secured on the tubular male element of the connector.

The cooling may be accelerated somewhat, as for example with the use of blown air.

The temperature to which the tubing section end is elevated is preferably below the melting point range for the material which is approximately from about 120° to 130° C. The exact temperature to which the tubing end section 26 is heated will depend, of course, upon the wall thickness of the tubing and may readily be determined empirically.

I claim:

1. A method of making a polybutylene tubing connection comprising the steps of treating an end of such tubing to make it flowable, telescoping a non-tapered male coupling element into said treated end, said male coupling element including a plurality of radially projecting annular barbs having undercuts in the direction of the tubing end on the outside diameter thereof and a stop shoulder, mechanically compressing said treated tubing end while said end is still flowable against said male coupling element with pressing dies accommodating said barbs to cause said treated tubing end to flow around said barbs and into said undercuts, shrinking said treated tubing end to secure said treated tubing end to said male coupling element, and embracing said treated tubing end with a metal crimping ring placed between said stop shoulder and the next adjacent barb.

2. A method as set forth in claim 1 wherein said treating step is heating the tubing end.

3. A method as set forth in claim 1 wherein the shrinkage is obtained by ambient cooling over a prolonged period.

4. A plastic tube coupling comprising a non-tapered male tubular element having an outside diameter and an inside diameter with a stop shoulder on one end of the outside diameter of said element, a series of annular radially projecting barbs each including at least two intersecting conical surfaces both extending at an acute angle to the axis of said element and directed toward said stop shoulder and located on the outside diameter of said element and having undercut grooves, a polybutylene tube having the same inside diameter as the inside diameter of said male element throughout its major length and including an expanded end which is treated to make it flowable and which is slipped over said male element against said stop shoulder and then mechanically compressed while said expanded end is in flowable condition to intimately embrace said male element and flow around said barbs and into said undercut grooves and create a plurality of grooves compressed into said expanded end by such mechanical compressing such that said grooves alternate with said barbs, and a metal crimping ring embracing the end of said polybutylene tube placed between said stop shoulder and the next adjacent barb.

* * * * *